United States Patent Office 3,842,031
Patented Oct. 15, 1974

3,842,031
FRICTION MATERIAL
John B. Lumb, Bradford, and Michael Edwards, Leeds, England, assignors to BBA Group Limited, Cleckheaton, Yorkshire, England
No Drawing. Continuation-in-part of application Ser. No. 133,765, Apr. 13, 1971, now Patent No. 3,723,382. This application Nov. 28, 1972, Ser. No. 310,001
Claims priority, application Great Britain, Nov. 29, 1971, 55,315/71
The portion of the term of the patent subsequent to Mar. 27, 1990, has been disclaimed
Int. Cl. C08g 51/04
U.S. Cl. 260—38
15 Claims

ABSTRACT OF THE DISCLOSURE

A friction material for friction braking or transmission systems including in its finished state a two-part binder system, one part being constituted by a thermosetting resin and the other part being constituted by two materials which react together under the action of heat generated during application of the system to form a compound which provides additional binding for the material and compensates for thermal decomposition of the resin. In one embodiment the two materials are nickel and sulphur, and in another embodiment the two materials are nickel and antimony sulphide. In both embodiments the two materials react to form nickel sulphide in situ. Friction modifiers, fillers and reinforcing materials such as asbestos can be included in the friction material of each embodiment. In a third embodiment, no thermosetting resin is used, the friction material being constituted by nickel sulfide formed in situ from nickel and antimony sulfide, together with a filler and/or a friction modifier. A reinforcing material such as asbestos can be included if desired.

CROSS-REFERENCE

This Patent Application is a Continuation-in-part of our earlier Patent Application Ser. No. 133,765, now U.S. Patent 3,723,382.

This invention relates to friction materials which are particularly intended for use in providing contact surfaces in friction braking or transmission systems such for example as used in disc brakes, internal shoe drum brakes, clutch facings, and railway brake blocks.

Hitherto, such friction materials have usually consisted of mixtures of fibrous material, generally fibrous inorganic material, such as asbestos fibre, metallic and non-metallic fillers, binders, and friction modifiers, the mixture being moulded into a dense state by the application of heat and pressure.

Friction materials which are to be used in disc brakes are subjected to considerably higher temperatures and pressures than the material which is intended for use in drum brake installations, and consequently have higher rates of wear. Moreover, the highest temperatures can also lead to a thermal breakdown of the binder material, which causes the coefficient of friction of the material to decrease. The reduction in the coefficient of friction of the material, which sometimes occurs during heavy and continuous braking, is referred to as "fade."

It is a main object of the present invention to provide an improved friction material which is less susceptible to "fade" than previous friction materials which include thermosetting resins.

A further object of this invention which is fulfilled by one of the embodiments thereof is to provide a friction material in which the use of a thermosetting resin as binder is eliminated.

A still further object of the invention, which is fulfilled by other embodiments, is to provide a friction material in which deterioration of thermosetting resin binder in the friction material is compensated for by the formation of an additional binder, this binder being formed in situ during use of the friction material.

Our investigations have suggested that, in friction materials which incorporate only conventional thermosetting resin binders, the heat generated under heavy and prolonged braking is often sufficient to decompose the thermosetting resin on the contacting surfaces of the friction material, and this results in fade and high rates of wear. According to one aspect of our invention, we provide a friction material for use in friction braking or transmission systems which friction material contains a two-part-binder system, one part comprising a thermosetting resin, and the other part comprising a mixture of at least two materials which combine progressively by reacting with each other under the action of heat developed as a result of the frictional engagement of the friction material within the system, to provide additional binding for the friction material and thereby to compensate for any deterioration in friction or wear characteristics of the friction material as a result of thermal decomposition of the thermosetting resin.

We have found that finely-divided nickel and sulphur are particularly suitable materials for incorporation in the friction materials. Alternatively, nickel and antimony sulphide can be incorporated in the friction material. Both these pairs of substances react together to form nickel suphide when heated to a temperature such as is developed in friction braking or transmission systems as a result of prolonged application of the system. When the two materials are incorporated in a friction material, the nickel sulphide generated by reaction of the nickel and sulphur or nickel and antimony sulphide forms a matrix which binds together the friction material and thereby prevents further deterioration of the friction material.

Depending on the method by which the friction material is manufactured, the nickel and sulphur or nickel and antimony sulphide may be wholly or substantially wholly uncombined in the finished friction material, or they may have partially reacted with each other to form nickel sulphide in situ, any uncombined nickel and sulphur or antimony sulphide in each case being capable of reaction to form a nickel sulphide binder under the action of heat developed as a result of frictional engagement.

The aforementioned friction materials of the present invention may further include, if desired, a fibrous reinforcing material such as asbestos, one or more fillers and/or one or more friction modifiers. The filler may be a metal, such as brass powder or a non-metallic material such as calcium carbonate powder, rottenstone or any other well-known filler. A friction modifier may be incorporated into the material in order to help to maintain the coefficient of friction of the material at a desired level over a range of temperatures. Thus, an abrasive friction modifier such as alumina, and/or Carborundum powder, can be incorporated in the mixture to increase the coefficient of friction of the final material, or a lubricative friction modifier, such as graphite or barytes, may be incorporated to reduce the coefficient of friction of the final material.

The thermosetting resins which may be incorporated in a friction material according to the invention are preferably phenolic thermosetting resins and include organic resins such as phenol formaldehyde and organic resins which have been modified by the substitution of inorganic groups on to the organic molecule e.g. borated phenolic resins. Mixtures of different thermosetting resins of either type may also be used in a friction material according to the present invention.

Friction materials incorporating nickel and sulphur may be manufactured in accordance with this invention by mixing finely divided nickel and sulphur, asbestos, or other inorganic fibrous material with a thermosetting resin, compressing the mixture, and heating the compressed mixture to a temperature sufficiently high to cure the resin e.g. between 120° C. and 180° C. Preferably, the heating is carried out in two stages, first by applying sufficient heat partly to cure the thermosetting resin whilst compressing the mixture, and subsequently heating the mixture after compression in order to complete the curing of the resin. After curing at these temperatures, the finished friction material will contain little or no nickel sulphide. However, nickel sulphide will be formed from the nickel and the sulphur under the action of heat developed as a result of the frictional engagement of the friction material within the friction braking or transmission system.

An alternative manufacturing process, however is to cure the compressed mixture at sufficiently high temperatures to cause at least some of the nickel to react with at least some of the sulphur to form nickel sulphide. At manufacturing temperatures in excess of 250° C., and in particular in the region of 300° C., the nickel and sulphur in the finished friction material will be wholly or substantially wholly present as nickel sulphide, and no further reaction will take place in the friction material when it is used.

In a preferred method of forming friction material according to the present invention inorganic fibrous material, fillers, thermosetting resin, finely divided nickel, sulphur and any desired friction modifiers are all intimately mixed together in a mixer or blending machine. A moulding operation is then carried out in which a mould, for example, a disc pad mould, is charged with the mixture. The mixture is then cured by the application of heat and pressure. Generally the curing time is in the order of five to ten minutes and the pressures which are applied to the mould are from ½ to ten tons per square inch. It will be appreciated that the precise temperatures and pressures used in the moulding operation depend upon the relative quantities of the constituents of the friction material.

The initial application of heat and pressure causes the mixture partly to cure. The composition of the partly cured mixture depends upon the temperature and the length of time for which the mixture was cured. Thus, the temperature and curing period in the moulding operation may only be sufficiently high to initiate curing of the thermosetting resin. For example, the temperature on the face of the mould may be between 120 and 180° C. Alternatively, if higher temperatures are used, for example in excess of 250° C., combination of the finely divided nickel with the sulphur to form nickel sulphide may be initiated. The partly-cured mixture is then removed from the mould and heated in an oven sufficiently to complete the curing process. For example, the partly-cured mixture may be heated for two to twenty-four hours at a temperature of from 90° to 300° C. Depending on the temperature selected, the finished product will contain completely cured thermosetting resin, the nickel and sulphur being either uncombined or partly or completely combined as nickel sulphide.

An example of the ingredients (in parts by weight) from which friction material according to the present invention may be made is shown:

| Ingredient | Parts by weight |
|---|---|
| Asbestos fibre | 10–50 |
| Thermosetting resin | 5–30 |
| Nickel | 2–30 |
| Sulphur | 2–15 |
| Brass | 5–15 |
| Graphite | 2–10 |
| Alumina | 2–10 |
| Barytes | 5–25 |
| Calcium carbonate | 2–10 |

An example of friction material made according to the present invention is shown below:

| Ingredient | Parts by weight |
|---|---|
| Asbestos fibre | 25 |
| Phenolic resin | 8 |
| Nickel | 15 |
| Sulphur | 6 |
| Brass powder | 10 |
| Graphite | 6 |
| Barytes | 24 |

The ingredients were weighed out and mixed together in a blending machine for thirty minutes. The materials were then charged into a disc brake pad mould, and moulded in a press at a temperature of 155° C. and at a pressure of one ton per square inch for ten minutes. The material was then removed from the mould, placed in an oven and heated at a temperature of 180° C. for ten hours.

The nickel and sulphur contained in the finished material were mainly present as the uncombined elements.

The materials were tested on an inertia dynamometer in order to investigate their wear characteristics as follows:

Two pads of the friction material each having an area of five square inches were used as brake pads in an automobile disc brake caliper, each pad being located on a respective side of a 10 inch diameter braking disc.

The material was subjected to a test schedule of 150 applications in which the rate of rotation of the disc was equivalent to road speeds of up to 80 m.p.h. Under these conditions kinetic energy of up to $40 \times 10^4$ ft. lb. f. was dissipated. During part of the test, torque was maintained at 400 lb. f. ft. and during the remainder it varied between 100 and 600 lb. f. ft. The temperature measured on the face of the braking disc during the test schedule varied from ambient to 400° C. The average wear on each of the disc pads after the test schedule was 0.005 inches.

A conventional friction material based on asbestos and a thermosetting resin was subjected to an identical test schedule and the average wear on each of these disc pads was 0.030 inches.

In order to manufacture a friction material in accordance with this invention which is based upon nickel, antimony sulphide and a thermosetting resin, finely divided nickel, curable thermosetting resin, and antimony sulphide are mixed together. The mixture is then compressed and heated to a temperature sufficiently high to cure the thermosetting resin. Although the manufacturing conditions in this method need not be sufficiently extreme to cause the nickel and the antimony sulphide to react to form nickel sulphide, under operating conditions, the surface temperatures generated in the friction materials would be sufficiently high to effect this reaction between the nickel and the antimony sulphide. Since conventional thermosetting resins usually begin to decompose at temperatures greater than 300° C., it will be appreciated that the formation of the nickel sulphide when the pad is in use should begin at approximately the same temperature as that at which the thermosetting resin binder begins to decompose.

If desired, the friction material may be manufactured so that, in its finished state, it contains as binder both a thermosetting resin and nickel sulphide formed from the nickel and the antimony sulphide. This material can be manufactured by mixing together finely divided nickel, a curable thermosetting resin, and antimony sulphide, compressing the mixture, and heating it to a temperature sufficiently high to cure the thermosetting resin and to cause at least some of the finely divided nickel to combine with at least some of the antimony sulphide to form nickel sulphide.

If extremely high temperatures, for example in the order of 600° C. are used in the curing step of this process, the thermosetting resin is quickly decomposed and carbonised. However, if the reaction is carried out over a long period at a lower temperature (for example in the order of 325–400° C.) the thermosetting resin can be cured without total decomposition, and at least some of the nickel can be made to combine with at least some of the antimony sulphide to form a nickel sulphide binder. During such a slow curing process, the compressed mixture is preferably held rigidly in a clamped position to avoid distortion of the compacted mixture. The compacted material, which will generally be moulded into a desired shape, for example a pad, block or curved drumbrake lining, can then be incorporated into a power transmission or friction braking system in a conventional manner and without further shaping.

If it is desired to manufacture a friction material containing nickel, antimony sulphide and a thermosetting resin with the nickel and antimony sulphide uncombined, the compressed ingredients are usually heated to a temperature of from 120 to 180° C. depending upon the particular resin used. The thermosetting resin may be cured in one stage but is preferably cured in two stages, first by applying sufficient heat partly to cure the resin whilst compressing the mixture and subsequently heating the mixture after compression in order to complete the curing of the resin. Typical heating conditions for the two curing stages are, in the first stage, 120 to 180° C. for 5 to 10 minutes, and 90 to 300° C. for 2 to 24 hours in the second stage. Where the compacted friction material contains a thermosetting resin, 2 to 25% by weight of thermosetting resin, 2 to 25% by weight of thermosetting resin will normally be used as a binder with from 3 to 30% by weight of nickel and 2 to 20% by weight of antimony sulphide. If desired, 5 to 60% by weight of asbestos fibre and/or 5 to 50% by weight of filler may be incorporated.

Our research work has not only shown that nickel and antimony sulphide can be used in a friction material to supplement the binding action of normal thermosetting resin binders but also indicates that nickel sulphide formed from nickel and antimony sulphide can, in combination with one or more fillers and/or friction modifiers act as a suitable friction material by itself. According to this still further aspect of the invention, therefore, there is provided a compacted friction material comprising nickel sulphide formed in situ from finely divided nickel and antimony sulphide, and at least one filler and/or friction modifier. Any of the conventional fillers and friction modifiers mentioned above are suitable for incorporation in this material. Preferably, the friction material further includes an inorganic fibrous reinforcing material such as asbestos.

In order to manufacture the compacted friction material which does not contain a thermosetting resin binder, finely divided nickel, antimony sulphide and one or more fillers and/or friction modifiers are mixed together, the mixture is then compressed and heated to a temperature sufficiently high to cause the nickel and the antimony sulphide to combine to form nickel sulphide. At normal pressure, nickel and antimony sulphide react together to form nickel sulphide at temperatures in excess of 325° C. and, in order to effect speedy reaction of the nickel and antimony sulphide, temperatures in the region of 600° C. will generally be required.

The nickel and the antimony sulphide may be heated together in this way in a wide range of proportions. For example, from 15 to 85% by weight of nickel may be heated with from 5 to 65% by weight of antimony sulphide. Normally, from 5 to 45% by weight of a filler or friction modifier will be incorporated in the friction material. 5 to 50% by weight of asbestos fibre may be incorporated as a reinforcing material.

Where a friction modifier is used, the exact amount will depend upon the desired frictional characteristics of the finished product. For example, from 5 to 25% by weight of barytes may be added to decrease the coefficient of friction of the finished material.

The following examples further illustrate the invention:

EXAMPLE 1

Friction material containing nickel sulphide and filler

A mixture of 45% by weight of finely divided nickel, 30% by weight of antimony sulphide, 20% by weight of asbestos fibre and 5% by weight of barytes was prepared. The mixture was compressed in a die at a pressure of 15 tons per square inch. The mixture was then removed from the die and heated in air in a muffle furnace to a temperature of 600° C. During the heating, the nickel and the antimony sulphide combined together to form nickel sulphide. The resultant material was hard and strong and its physical properties were those characteristic of a friction material suitable for use in friction braking or power transmission systems.

EXAMPLE 2

Friction material containing nickel, antimony sulphide and a thermosetting resin A mixture of the following compounds was prepared:

| Ingredient | Percent by weight |
|---|---|
| Nickel | 20 |
| Antimony sulphide | 15 |
| Phenolic resin | 15 |
| Asbestos fibre | 45 |
| Graphite | 5 |

The material was charged into a mould and compressed at a pressure of 1 ton per square inch for 10 minutes at 150° C. The material was then removed from the mould, placed in an oven and heated to a temperature of 200° C. for 10 hours. The resulting material contained uncombined nickel and antimony sulphide bound together by the phenolic resin and could be used as a friction material.

EXAMPLE 3

Friction material containing nickel sulphide and a thermosetting resin

A mixture of ingredients as set out in Example 2 was prepared. The mixture was compressed and heated in a clamped position at a temperature rising from 200 to 400° C. over four hours.

The nickel and antimony sulphide in the original mixture had almost completely combined to form nickel sulphide. Some carbonisation of the thermosetting resin had occurred but the bulk of the resin was undecomposed. The frictional properties of this material were characteristic of a material suitable for use in a friction braking or power transmission system.

We claim:

1. A compacted friction material comprising nickel sulphide formed in situ from 15% to 85% by weight of finely divided nickel and 5% to 65% by weight of antimony sulphide, and 5% to 45% by weight of at least one material selected from the group consisting of fillers and friction modifiers.

2. A compacted friction material according to Claim 1 further including 5% to 50% by weight of a fibrous inorganic reinforcing material such as asbestos.

3. A compacted friction material which comprises a binder having 2% to 25% by weight of a thermosetting resin part and a further part which consists of nickel sulphide formed in situ from 3% to 30% by weight of finely divided nickel and 2% to 20% by weight of antimony sulphide.

4. A compacted friction material comprising 3% to 30% by weight of finely divided nickel, 2% to 20% by weight of antimony sulphide and 2% to 25% by weight of a thermosetting resin binder.

5. A compacted friction material according to Claim 3 wherein the thermosetting resin is an organic thermosetting resin.

6. A compacted friction material according to Claim 3 wherein the thermosetting resin comprises an organic thermosetting resin which contains inorganic substituent groups.

7. A compacted friction material according to Claim 3 further including 5% to 60% by weight of a fibrous inorganic reinforcing material such as asbestos.

8. A compacted friction material according to Claim 3 further including 5% to 50% by weight of at least one material selected from the group consisting of fillers and friction modifiers.

9. A method of manufacturing a compacted friction material comprising the steps of mixing together 15% to 85% by weight of finely divided nickel, 5% to 65% by weight of antimony sulphide and 5% to 45% by weight of at least one material selected from the group consisting of fillers and friction modifiers, compressing the mixture, and heating it to a temperature sufficiently high to cause the nickel and the antimony sulphide to combine to form nickel sulphide.

10. A method according to Claim 9 wherein the mixture is heated whilst being maintained under pressure in a desired shape.

11. A method of manufacturing a compacted friction material comprising the steps of mixing together 3% to 30% by weight of finely divided nickel, 2% to 20% by weight of antimony sulphide and 2% to 25% by weight of a curable thermosetting resin, compressing the mixture and heating it to a temperature sufficiently high to cure the thermosetting resin.

12. A method according to Claim 11 which comprises compressing the mixture and simultaneously with such compression applying heat partly to cure the thermosetting resin and after its compression further heating the mixture completely to cure the resin.

13. A method of manufacturing a compacted friction material comprising the steps of mixing together 3% to 30% by weight of finely divided nickel, 2% to 20% by weight of antimony sulphide and 2% to 25% by weight of a curable thermosetting resin, compressing the mixture, and heating it to a temperature sufficiently high to cure the thermosetting resin and to cause at least some of the finely divided nickel to combine with at least some of the antimony sulphide to form nickel sulphide.

14. A compacted friction material for use in a friction braking or power transmission system which includes a two part binder system, one part comprising 2% to 25% by weight of a thermosetting resin and the other part comprising a mixture of 2% to 20% by weight of antimony sulphide and 3% to 30% by weight of nickel capable of progressively combining under the action of heat developed as a result of the frictional engagement of the friction material within the braking or transmission system to provide additional binding for the friction material.

15. A compacted friction material according to Claim 14 comprising 5% to 60% by weight of inorganic fibrous material such as asbestos.

References Cited

UNITED STATES PATENTS

| | | | |
|---|---|---|---|
| 3,723,382 | 3/1973 | Lumb et al. | 260—DIG. 39 X |
| 3,660,120 | 5/1972 | Clark et al. | 106—36 |
| 2,252,991 | 8/1941 | Steck | 106—36 |
| 3,402,054 | 9/1968 | Wood et al. | 106—36 |

OTHER REFERENCES

J. W. Mellor, *Comprehensive Treatise on Inorg. and Theor. Chemistry* (1922), QD31.m4, vol. 9, p. 525.

MORRIS LIEBMAN, Primary Examiner

S. M. PERSON, Assistant Examiner

U.S. Cl. X.R.

106—36; 260—DIG. 39